United States Patent
DiMaio

[15] 3,641,814
[45] Feb. 15, 1972

[54] ELECTRONIC METHOD AND APPARATUS FOR AUDIBLY DETECTING CHANGES

[72] Inventor: Vincent DiMaio, Toledo, Ohio
[73] Assignee: Customflex, Inc., Toledo, Ohio
[22] Filed: May 7, 1970
[21] Appl. No.: 35,507

[52] U.S. Cl. .................................................73/186, 325/67
[51] Int. Cl. .......................................................G01c 21/00
[58] Field of Search .................73/186; 325/67, 492; 331/65

[56] References Cited

UNITED STATES PATENTS 3,160,750   12/1964   Klehn ..................................325/67 X

*Primary Examiner*—Donald O. Woodiel
*Attorney*—Malcolm W. Fraser

[57] ABSTRACT

Device for measuring the relative change in a variety of physical phenomenon, such as acceleration, pressure, temperature, etc., by an audible signal. A transducer has a pivoted extensible rod for indicating changes in velocity of an object moved through a fluid medium, such as water. The rocking of the arm is operative to shift a ferrite core within an insulated coil forming one part of an audio oscillator circuit. The coil is connected to a portable transistor radio, and the movement of the ferrite core through the insulated coil changes the induction of the coil producing a change in the audio oscillator circuit in a transistor radio. This produces a change in the sound produced by the radio. According to an alternate form, a stationary rod on which a strain gauge is mounted is similarly connected to a transistor radio.

9 Claims, 5 Drawing Figures

PATENTED FEB 15 1972

INVENTOR.
VINCENT DI MAIO
BY Malcolm W. Fraser
ATTORNEY

ELECTRONIC METHOD AND APPARATUS FOR AUDIBLY DETECTING CHANGES

BACKGROUND OF THE INVENTION

There are a great number of electronic transducers for absolute measurement of physical variables, particularly U.S. Pats. to Chope, No. 3,158,028, Nov. 24, 1964; Chass, No. 3,168,830, Feb. 9, 1965; and Cherniak, No. 2,909,739, Oct. 20, 1959. All these systems or devices employ electromagnetic variations or oscillators and amplifiers to present visual readout either in analog or digital mode. These systems are excellent for absolute readings and good accuracy. However, in many instances absolute values of measurement are not as important or as critical as the relative change in these values. It may be more significant to know whether a value is increasing, decreasing, or remaining constant. It may also be impossible physically to observe the readout because of the observer's visual absorption with other duties, readings, etc.

An audible signal which varies in frequency or pitch can present relative intelligence without visual attention and with remarkable accuracy provided that its variations can be reduced to a level easy for the ears to discern. For example, the ear has difficulty in detecting the difference between 500 clicks per second and 505 clicks per second. It has no trouble detecting the same difference between 10 clicks per second and 15 clicks per second. If audible oscillation can be reduced or "calibrated" down to a low rate, extremely small relative changes are easily determined and accuracy rapidly increases.

SUMMARY OF THE INVENTION

It is an object of this invention to produce a method of audibly indicating relative changes in the values of a variety of physical phenomenon. It is a further object of this invention to produce a method of acquiring extreme accuracy or the ability of detecting miniscule changes in a wide variety of physical phenomenon by being able continuously to calibrate or reduce the transduced audible digital signal to a low rate where differences become more readily apparent. A further object of this invention is to produce a simple, inexpensive, compact, and portable transducer for accomplishing these methods.

DESCRIPTION OF THE PREFERRED EMBODIMENT

Figure 1:
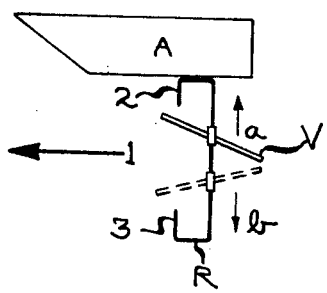
FIG. 1 is a diagrammatic view showing a simple mechanical device for producing an audible sound according to the prior art, the same indicating acceleration of an object moved through a fluid medium, such as water.
Figure 2:
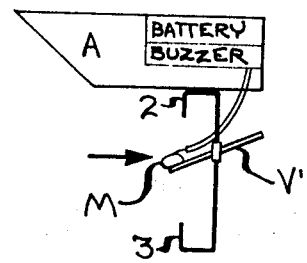
FIG. 2 is a diagrammatic view of an electrical device according to the prior art for accomplishing the same purpose as that of FIG. 1.

The devices shown in FIGS. 1 and 2 are those according to the prior art and are shown and described to enable a better understanding of this invention. It will be understood that FIG. 1 shows a mechanical device, whereas FIG. 2 shows an electrical device, each for accomplishing the same purpose. With reference to FIG. 1, the object A is moving horizontally in the direction of the arrow 1. Fixed to the object A for movement through the water is a simple transducer consisting of a vertical rod R having inturned ends 2 and 3. Mounted on the vertical rod is a sliding and tilting vane V which, when moved through the water, produced a vertical force as indicated by the arrows $a$ and $b$ (depending on the direction of the tilt of the vane). The vane is shown in a full line position and a broken line position indicating the movement of the extremities of the vane where it makes contact with the end portions 2 and 3 to reverse its direction. It will be understood that this alternate change in direction is a simple, continuous oscillation which produces a digital sound on contact at each extremity. The rate of impulses is an indication of the speed, but the rate of change of the impulses is an indication of the relative increase or decrease of speed. At low rate of contact this vane is simple to detect, but at high rates detection is much more difficult, if not impossible. This transducer has the further disadvantage that its response is not linear but varies logarithmically since the force on the vane varies on the square of the velocity.

Instead of the transducer being a mechanical one as shown in FIG. 1, it may be an electrical one as shown on FIG. 2 in which a mercury switch M mounted on the slide and tilting vane V' produces an electrical impulse to operate a buzzer or solenoid as indicated by the legend. Thus, the devices as shown in FIGS. 1 and 2 operate simply, but are objectionable and unsatisfactory because of the impossibility to detect the difference in the rate of change of the impulses.

Figure 3:
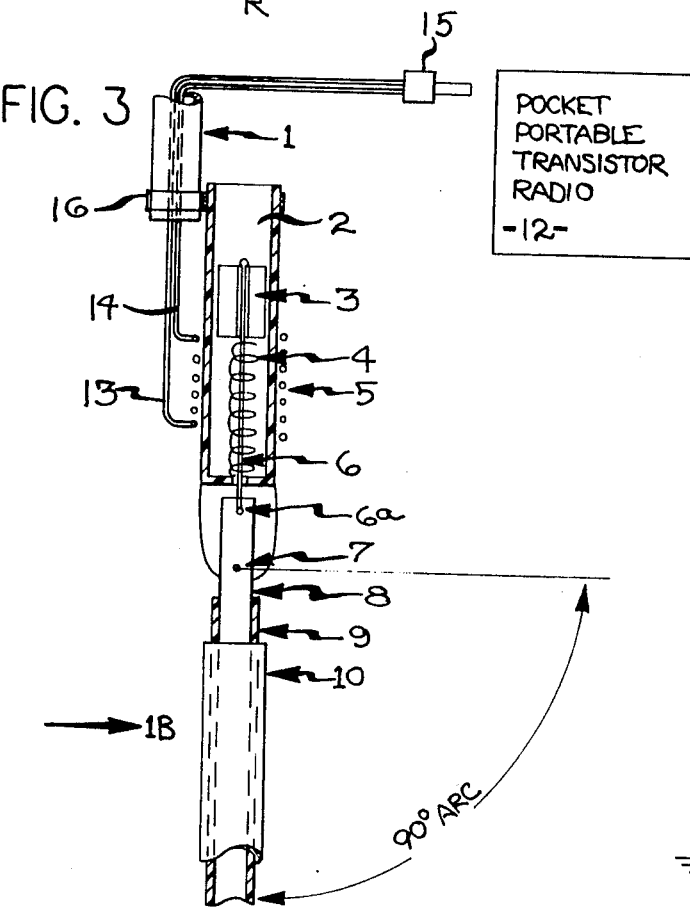
FIG. 3 is a diagrammatic view of an electronic device according to the invention for producing an audible sound indicating changes in velocity of an object moved through a fluid medium, such as water.

The invention according to FIG. 3 shows a transducer consisting of a small brass rod 8 pivotally mounted intermediate its ends on a shaft 7. Disposed at one end of the rod 8 and connected at 6a is a dacron thread 6 which passes through a coiled compression spring 4 and a ferrite core 3 which rests against the spring. The end of the thread 6, at the outer end of the ferrite core, is knotted so it cannot be pulled through it. These elements are contained in a hollow plastic cylinder 2 which is wrapped with an insulated coil 5 which is one part of an audio oscillator circuit. To the brass tube 8 is fastened a plastic tube 9 which is a telescoped fit into the plastic tube 10. The plastic tube 10 can be used to extend the tube 9 or can be removed to reduce the total area of the pivoting arm. It can be seen that as water pressure moving in the direction of the arrow 1B strikes the arm 8, 9, and 10, it moves in an arc pulling on the string 6 and drawing the ferrite core 3 into the coil 5 compressing the spring 4. This changes the induction of the coil 5 producing a change in the audio oscillator circuit in the transistor radio 12. This change results in a change in the sound produced by the radio.

The device above described is connected to an ordinary pocket-size portable transistor radio 12 by leads 13 and 14 extending from the ends of the coil 5 respectively. The leads 13 and 14 which are shielded, connect to a phone jack 15 which plugs into the radio 12 in the usual manner, the jack connection being provided in most transistor radios for earplug use. The leads 13 and 14 pass through a vertical tube 1 of appropriate length which is clamped by a band 16 to the plastic tube 2. In use the tube 1 is suitably secured to the side of a sailboat and is of sufficient length so that the arm 8, 9, 10 is submerged in the water and is disposed at right angles to the forward movement of the boat.

Figure 4:
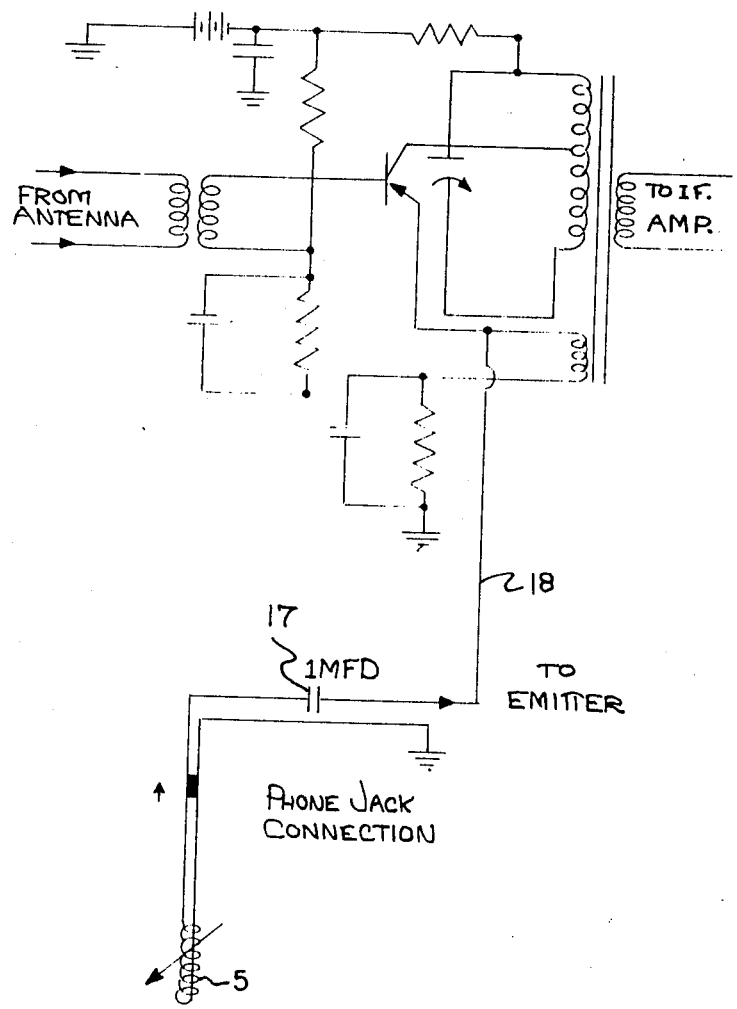
FIG. 4 is a schematic view of the electrical circuit of the electronic device according to FIG. 3.

In FIG. 4 there is shown a wiring diagram for a typical transistor converter which combines the functions of an oscillator and mixer. To this circuit (which is well known to those skilled in this art so that detail description is not given) there is added a 1 mfd. capacitor 17 and a variable inductive coil 5 (see FIG. 3) in a series-tuned circuit as an additional audio oscillator injected into the emitter through the lead 18. Motorboating is interference heard as the characteristic "putt-putt" made by a motorboat. It is due to self-oscillation, usually pulsating, in an amplifier below or at low audio frequency. Motorboating has no necessary connection, except sound similarity, with boats driven by motors. Controlled motorboating results which can be effected either by varying the inductance of the coil 5 or varying the capacitance of the radio's local oscillator capacitor by turning the tuning dial. This gives the ability to change the rate of digital motorboat clicks either from the transducer motion or the radio set (sound wave). It is now possible continuously to calibrate the transducer back to a few clicks per second at any velocity or angle of the pivot arm 8, 9, 10. Changes in the rate of speed of a sailboat can be readily determined.

In addition, because the pivot arm 8, 9, 10 moves radially, its frontal surface area is reduced by the cosine of the pivot angle and its motion is less at greater forces of water pressure. This effect, plus the spring load, compensates for the squared velocity force to produce an almost lineal response to velocity changes. At low velocities the telescoping tube 10 can be extended to increase sensitivity be increasing the area and leverage. At high velocities it can be removed entirely. As above mentioned, the transducer is connected to the transistor radio 12 with a length of shielded cable and a phone plug. Removal of the plug from the radio detaches our oscillator circuit and restores the radio to its original function. A transistor radio is used as a sound source because it has all the elements needed in a compact, low cost form. An electric metronome with two separable components for controlling frequency could be used for the same purpose, one being for the transducer and one for the base level calibration.

Figure 5:
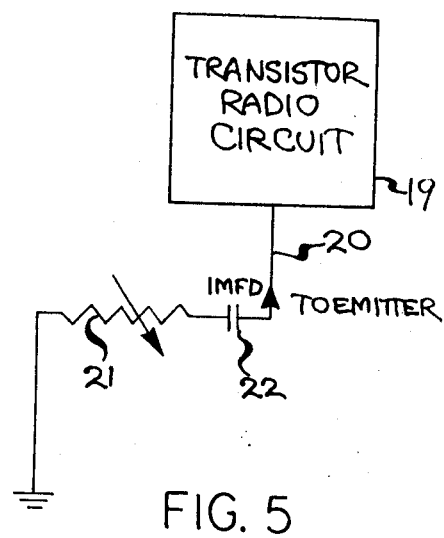
FIG. 5 is a schematic view of an alternate circuit embodying a strain gauge.

The circuit as shown on FIG. 5 is associated with the transistor radio circuit as shown on FIG. 4, such circuit being designated by the block 19 to which extends an emitter lead 20 corresponding to the lead 18 on FIG. 4. In this instance, a strain gauge is mounted on a rod depending into the water from a sailboat, the same being indicated as a variable resistor 21 and a 1 mfd. capacitor 22 on the drawing. Thus, the stretch of the rod produces the change of current flow through the strain gauge and thus produces motorboating.

I claim:

1. A device for providing an audible indication of the intensity of a physical phenomenon comprising:
   A. an inductive coil
   B. mechanical sensor means responsive to said intensity for changing the inductance value of said coil,
   C. means connected to said coil for producing electrical motorboating oscillations having a frequency controlled by said inductance value, and
   D. means for providing said audible indication of said electrical motorboating oscillations.

2. A device according to claim 1 wherein said physical phenomenon is the relative motion between said device and a fluid medium, and said intensity is the speed of said motion.

3. A device according to claim 2 wherein said mechanical sensor means comprises:
   A. a transducer rod adapted to be moved in response to the speed of relative motion between said device and said fluid medium, and
   B. a ferrite core situated within said coil and connected to be moved in response to movement of the transducer rod.

4. A device according to claim 3 wherein said means for producing electrical motorboating oscillations comprises:
   A. an oscillator and mixer conversion unit, and
   B. an additional audio oscillator including a tuned circuit which comprises a capacitor and said inductive coil, said additional audio oscillator serving to inject a signal into said conversion unit, thereby causing said conversion unit to produce said electrical motorboating oscillations.

5. A system according to claim 4 wherein said oscillator and mixer conversion unit includes a tuning capacitor to vary the oscillator frequency of said conversion unit, thereby changing the frequency of said electrical motorboating oscillations at a given speed of relative motion.

6. A device according to claim 5 wherein said conversion unit and means for providing said audible indications are integral parts of a conventional transistorized radio receiver with speaker.

7. A device according to claim 3 wherein said transducer rod is pivotally mounted to swing rearwardly in response to forward motion of said rod through said fluid medium, and further comprising:
   A. a compression spring adjacent to said ferrite core for resisting movement thereof in a direction corresponding to faster relative speed, and
   B. a thread connecting said rod and said core for causing movement of the core within the coil in response to pivotal motion of the rod.

8. A method of causing a conventional transistorized radio receiver, of the type having a speaker for producing an audible output, having a variable tuning capacitor for tuning said receiver and having a socket adapted to have an earphone plugged therein, to produce an audible output indicative of the intensity of a physical phenomenon, comprising the steps of:
   A. varying the inductance value of an inductive coil in response to said intensity,
   B. controlling the frequency of a generated signal in accordance with said inductance value,
   C. injecting said generated signal into the earphone socket, and
   D. varying said tuning capacitor while listening to the output of said speaker, thereby producing an audible output signal in the desired frequency range, any frequency change of said signal being indicative of the change in said intensity of a physical phenomenon.

9. A method according to claim 8 wherein said physical phenomenon is the relative motion between said coil and a fluid medium, and said intensity is the speed of said motion.

* * * * *